Aug. 17, 1954 J. L. LAWSON 2,686,877

AUTOMATIC FREQUENCY CONTROL SYSTEM

Filed March 27, 1946

INVENTOR.
JAMES L. LAWSON

BY [signature]

ATTORNEY

Aug. 17, 1954 J. L. LAWSON 2,686,877

AUTOMATIC FREQUENCY CONTROL SYSTEM

Filed March 27, 1946 2 Sheets-Sheet 2

INVENTOR.
JAMES L. LAWSON

BY M. A. Hayes

ATTORNEY

Patented Aug. 17, 1954

2,686,877

UNITED STATES PATENT OFFICE 2,686,877

AUTOMATIC FREQUENCY CONTROL SYSTEM

James L. Lawson, Schenectady, N. Y., assignor, by mesne assignments, to the United States of America as represented by the Secretary of the Navy Application March 27, 1946, Serial No. 657,384

10 Claims. (Cl. 250—36)

This invention relates to automatic frequency control systems and more particularly to a fast acting system of frequency control essentially free from ripple.

Automatic frequency control, hereinafter referred to as AFC, is accomplished in a radar system by varying the local oscillator frequency as the transmitter frequency varies in order to maintain the proper intermediate frequency for which the receiver is designed. More specifically, where velocity modulated tubes such as the reflex klystron are employed as local oscillators, the oscillator frequency is generally controlled by adjusting the repeller voltage. Two types of AFC systems are in common use. Both feed the beat frequency between transmitter and local oscillator through a discriminator tuned to the desired intermediate frequency. In the first type of AFC, the oscillator repeller voltage is controlled by a gas-tube saw-tooth voltage generator. As the saw-tooth voltage rises, the oscillator frequency falls and the beat frequency also falls. When the beat frequency falls below the intermediate frequency, the discriminator has a positive voltage output which fires the gas-tube causing the saw tooth to reverse and increase the frequency of the local oscillator. When the AFC is "locked" and the local oscillator is following the transmitter frequency separated by the intermediate frequency, the sawtooth sweep of the oscillator repeller voltage is very small so that the beat frequency is swept slightly about the intermediate frequency. This is a fast acting system of AFC which does, however, have a frequency ripple caused by the slight sweep of the oscillator repeller voltage.

The other type of AFC in common use has a discriminator whose time constants provide a slowly varying D.-C. output which is applied to the oscillator repeller through a low pass filter or a D.-C. amplifier stage. This system is, therefore, slow acting and does not meet the requirements of those radar systems in which the transmitting frequency is subject to "pulling" and the AFC must follow rapidly to prevent even momentary loss of signals.

The present invention overcomes the limitations of the foregoing AFC systems and provides fast acting AFC which is essentially free of frequency ripple.

An object of this invention is to provide a circuit for automatically maintaining the correct local oscillator frequency in a radar receiver.

Another object is to provide a ripple free repeller control voltage for velocity modulated oscillator tubes.

Another object is to provide an improved and simple type of fast acting automatic frequency control.

These and other objects and features of this invention will become apparent upon consideration of the following detailed description when taken together with the accompanying drawings, of which:

Figure 1:
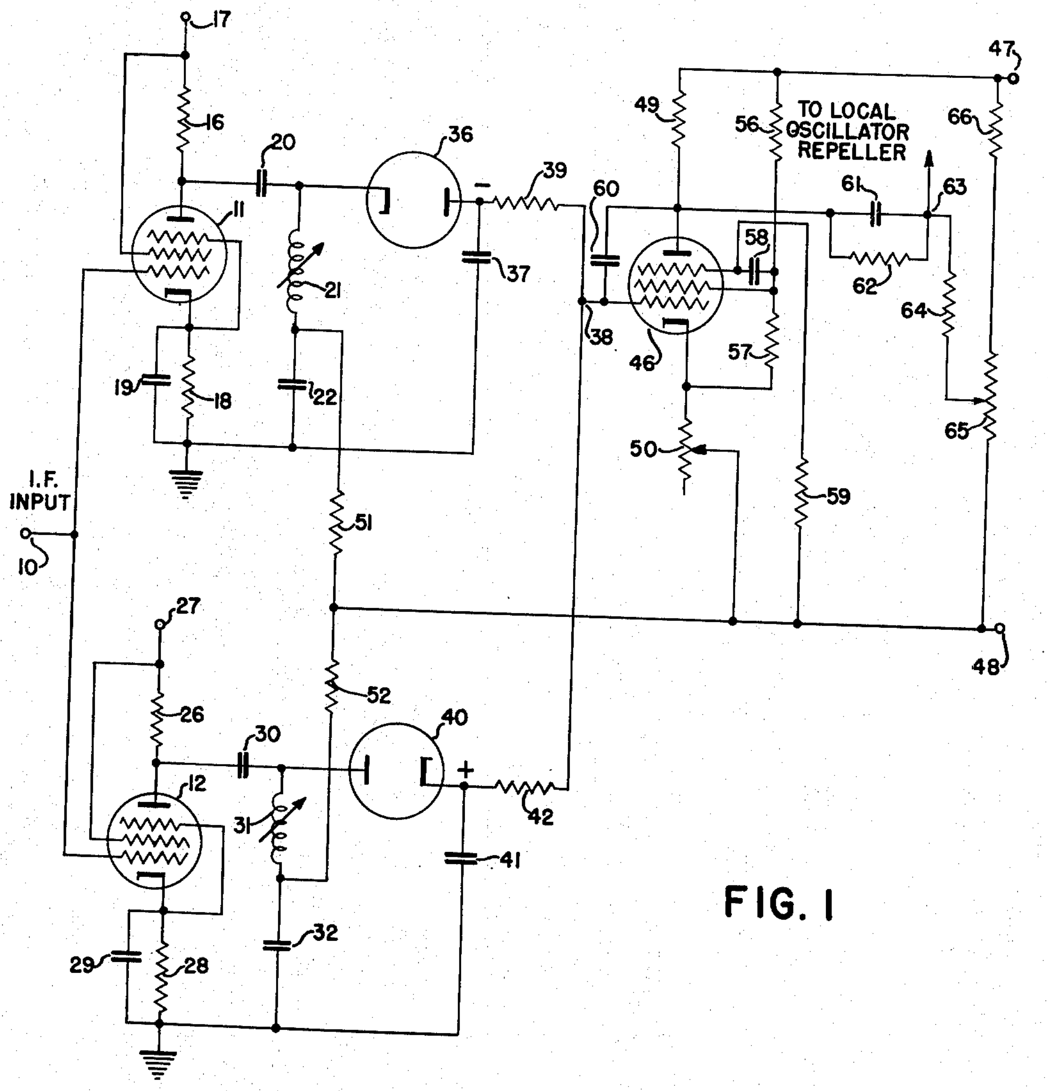
Fig. 1 is a schematic circuit diagram of an AFC circuit embodying this invention.

In Fig. 1, terminal 10 is the point of input to the AFC circuit of the intermediate frequency resulting from the beat of the transmitter frequency and the local oscillator frequency of a conventional radar system. The intermediate frequency or I. F. input is fed to two tuned frequency signal channels built around pentode amplifiers 11 and 12. Tube 11 receives plate voltage through resistor 16 from a source of voltage connected to terminal 17. The screen grid of tube 11 is also connected to terminal 17. The suppressor grid of tube 11 is tied to its cathode, which is grounded through the parallel combination of resistor 18 and capacitor 19. The I. F. input signals from terminal 10 are injected at the control grid of tube 11. Capacitor 20 and variable inductor 21 connected in series to the plate of tube 11 and grounded through capacitor 22 comprise the output circuit of tube 11, which is tuned to a predetermined frequency above the I. F. frequency.

Tube 12 receives plate voltage through resistor 26 from a source of voltage connected to terminal 27 and of the same potential as the voltage source connected to terminal 17. The screen grid of tube 12 connects to terminal 27. The suppressor grid of tube 12 is tied to its cathode, which is grounded through the parallel combination of resistor 28 and capacitor 29. The control grid of tube 12 is connected to terminal 10 to receive I. F. input signals. Capacitor 30 and variable inductor 31 connected in series to the plate of tube 12 and grounded through capacitor 32 comprise the output circuit of tube 12, which is tuned to a frequency below the I. F. frequency by the same amount that the output circuit of tube 11 is above the I. F. frequency.

The cathode of diode 36 connects to the junction of capacitor 20 and inductor 21. The plate of diode 36 is grounded through capacitor 37 and also connects to terminal 38 through resistor 39. The plate of diode 40 connects to the junction of capacitor 30 and inductor 31. The cathode of diode 40 is grounded through capacitor 41 and also connects to terminal 38 through resistor 42. It will be noted that diode 36 is connected as a negative output detector of the output of amplifier 11 and that diode 40 is connected as a positive output detector of the output of amplifier 12. The combined outputs of diodes 36 and 40 appear at terminal 38. The described circuit between I. F. input terminal 10 and terminal 38 constitutes, therefore, an I. F. discriminator. The discriminator has zero output when the I. F. input at terminal 10 is at the designed frequency. For this condition, amplifiers 11 and 12 have equal outputs and detectors 36 and 40 likewise have equal outputs which are opposed in polarity, the resultant output at terminal 38 being zero. When the input frequency at terminal 10 exceeds the I. F. frequency, the output of amplifier 11 is greater than the output of amplifier 12 and the resultant detected output at terminal 38 is negative in polarity. When the input frequency at terminal 10 is less than the I. F. frequency, the output of amplifier 11 is less than the output of amplifier 12 and the resultant output at terminal 38 is of positive polarity.

The discriminator output at terminal 38 is applied to the control grid of pentode 46. Pentode 46 functions dually as an amplifier and inverter of the discriminator output voltage for correcting the repeller voltage of the local oscillator and as a sweep tube for causing the local oscillator to search when the radar transmitter and local oscillator beat frequency pulls so far away from the I. F. frequency that there is no discriminator output. A source of power for pentode 46 is connected between terminals 47 and 48. The plate of pentode 46 is connected to terminal 47 through plate load resistor 49. The cathode of tube 46 is connected to one end of potentiometer 50 whose other end has no connection but whose slider arm connects to terminal 48. The discriminator diodes 36 and 40 are biased to operate at the voltage level of tube 46 by connecting terminal 48 to the junction of inductor 21 and capacitor 22 and the junction of inductor 31 and capacitor 32 through resistors 51 and 52 respectively. Resistor 51 and capacitor 22 and resistor 52 and capacitor 32 provide decoupling networks for the power supply at terminal 48. The screen grid potential of tube 46 is tapped from the junction of resistors 56 and 57 connected in series between terminal 47 and the cathode of tube 46. The suppressor grid of tube 46 is coupled to the screen grid by capacitor 58 and is tied to terminal 48 through resistor 59. Capacitor 60 couples the plate of tube 46 to the control grid. The output from the plate of tube 46 is coupled through capacitor 61 and resistor 62 in parallel to the local oscillator repeller from terminal 63. The quiescent voltage for the local oscillator repeller is taken from terminal 63 through resistor 64, connecting to the slider arm of potentiometer 65, whose resistor strip is connected in series with resistor 66 between terminals 47 and 48 to provide a voltage tapping arrangement.

When a small negative bias exists between the control grid and cathode of tube 46, tube 46 acts as a direct coupled amplifier. However, if the grid is less negative than the critical amount, tube 46 will act as a conventional transitron oscillator because of the screen grid and suppressor grid coupling through capacitor 58. A sawtooth voltage wave then appears on the plate of tube 46 and, therefore, at terminal 63, causing the local oscillator frequency to sweep. The repetition rate of the sawtooth voltage produced by tube 46 as a transitron is controlled by the time constant of capacitor 58 and resistor 59 in the suppressor grid circuit. The value of plate load resistor 49 chiefly determines the amplitude of the sawtooth voltage which is sufficient to sweep the local oscillator through a single mode. The mode in which the local oscillator operates is selected by the value of quiescent repeller voltage tapped off at terminal 63 from potentiometer 65.

Figure 2:
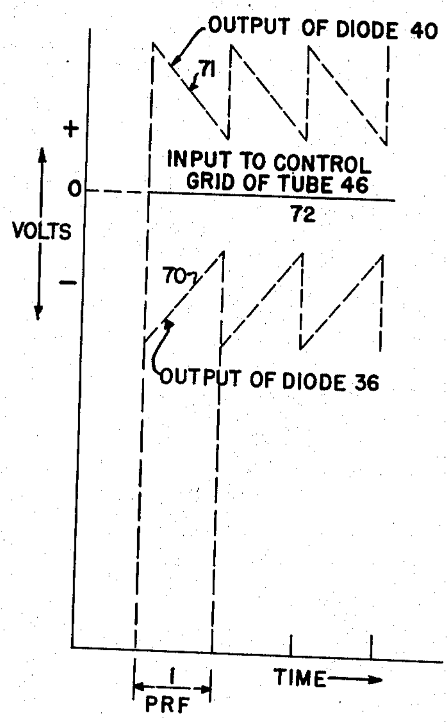
Fig. 2 illustrates the frequency discriminator output voltage when the local oscillator is on frequency.
Figure 3:
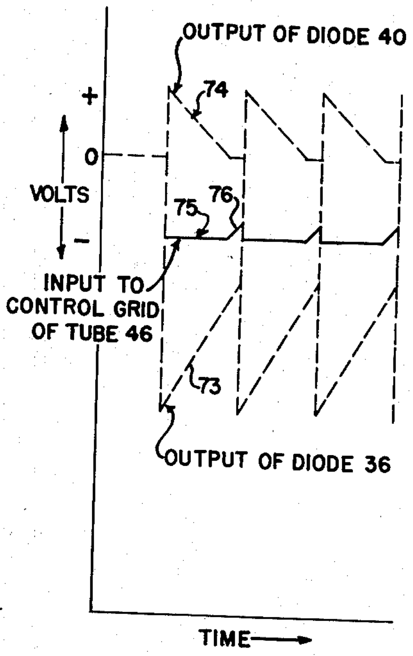
Fig. 3 illustrates the frequency discriminator output voltage when the local oscillator is off frequency by a slight amount.
Figure 4:
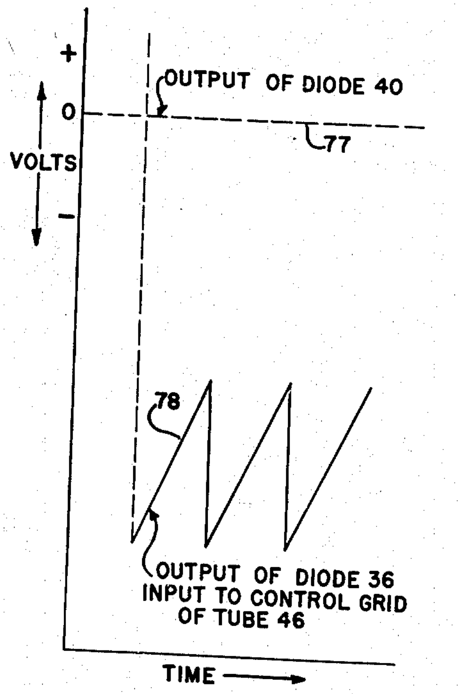
Fig. 4 illustrates the frequency discriminator output voltage when the local oscillator is off frequency by a considerable amount.

In Figs. 2, 3 and 4, three conditions of operation of the circuits of Fig. 1 have been considered. The local oscillator is assumed to be tuned to a frequency above the transmitter for proper operation. In Fig. 2, the beat frequency between the radar transmitter and local oscillator is exactly the I. F. frequency. The dotted wave forms 70 and 71 represent the voltage outputs of diodes 36 and 40 respectively versus time appearing at terminal 38. The time over which one voltage sweep takes place is equal to the period or the reciprocal of the pulse repetition frequency of transmitter operation. Heavy line 72 is the resultant of outputs 70 and 71, or the discriminator input to the control grid of tube 46. For this condition, voltage 72 is zero and the quiescent voltage at terminal 63 which is applied to the local oscillator repeller is unchanged. Actually, to assure discriminator stability it would be adjusted to have a slightly negative output when the beat frequency equals the intermediate frequency. Under this condition, the control grid-to-cathode bias of tube 46 can be set just sufficiently negative by adjustment of potentiometer 50 so that transitron action is precluded.

In Fig. 3, the local oscillator frequency is assumed to be slightly high so that the beat frequency is correspondingly higher than the I. F. frequency. The negative output 73 of detector 36 is now increased and the positive output 74 of detector 40 is decreased. The resulant discriminator input voltage 75 to tube 46 is negative and may have a small ripple 76, as shown, depending upon the discharge time constants in the outputs of diode 36 and 40 and the transmitter pulse repetition frequency. Negative signal 75 applied to the control grid of tube 46 results in a positive swing of the plate potential which increases the voltage applied to the local oscillator repeller from terminal 63. As the repeller voltage rises, the local oscillator frequency drops and the beat frequency is restored towards the I. F. frequency.

In Fig. 4, the local oscillator frequency is assumed to be so high and off frequency that the beat frequency is at the frequency to which tube 11 is tuned. There is then zero output from detector 40 as shown by line 77 and maximum negative ouput 78 from detector 36 which appears at the control grid of tube 46. The correction process for the local oscillator repeller voltage is the same as for the case of Fig. 3.

Should the local oscillator be so far off frequency that no discriminator output appears at terminal 38, the control grid of tube 46 tends to rise to the potential of terminal 48. Tube 46 then acts as a transitron oscillator and sweeps the voltage at terminal 63 through the operative mode of the local oscillator. As soon as the discriminator develops a negative error voltage at terminal 38, the sweep of tube 46 as a transitron ends and tube 46 again becomes a high gain amplifier. Similarly, if the local oscillator frequency is low so that the discriminator provides a positive error voltage at terminal 38, tube 46 will provide a sweep output to correct the local oscillator frequency. Of course, the cathode bias established by potentiometer 50 will determine how much of a positive signal can appear at the control grid of tube 46 before it acts as a transitron instead of as an amplifier.

Thus the illustrative embodiment of this invention is an AFC system which produces a substantially ripple-free control voltage for reflex velocity-modulated tube oscillators. Although there is shown and described only a certain specific embodiment of the invention, the many modifications possible thereof will be readily apparent to those skilled in the art. Therefore, this invention is not to be limited except insofar as is necessitated by the prior art and the spirit and scope of the appended claims.

What is claimed is:

1. An automatic frequency control system comprising, means for applying input signals to a first signal channel, said first signal channel providing negative output signals proportional to the difference of said input signals from a first predetermined frequency, means for applying said input signals to a second signal channel, said second signal channel providing positive output signals proportional to the difference of said input signals from a second predetermined frequency, means for combining said negative and said positive signals, and means responsive to said combined signals for restoring said input signals to a mid frequency between said first and second predetermined frequencies, said last-mentioned means being operative in the absence of said combined signals for varying said input signal frequency until said combined output signal appears.

2. An automatic frequency control system comprising, means for applying the beat frequency signals from a transmitter and local oscillator to a first tuned frequency signal channel, means for applying said beat signals to a second tuned frequency signal channel, said first and second channels being tuned respectively to frequencies an equal amount above and below a predetermined frequency, a first means for detecting the output of said first channel, a second means for detecting the output of said second channel, said second detecting means providing an output signal opposed in polarity to the output of said first detecting means, means for combining said first and second detected signals, and transitron oscillator means responsive to said combined signals for correcting the local oscillator frequency, whereby said beat frequency is maintained at said predetermined frequency.

3. An automatic frequency control system comprising, an input terminal adapted to receive beat frequency signals from a transmitter and local oscillator, first and second amplifier means coupled to said input terminal, said first and second amplifier means being tuned respectively an equal amount above and below a predetermined frequency, first and second rectifying means for detecting the outputs of said first and second amplifier means respectively, said first and second rectifying means being oppositely connected, means for combining the outputs of said first and second rectifying means, and transitron oscillator means responsive to said combined outputs for correcting the local oscillator frequency, whereby said beat frequency is maintained at said predetermined frequency.

4. An automatic frequency control system according to claim 3 wherein said first detecting means comprises, a first diode connected in series with a first capacitor across the output of said first amplifier means, the plate of said first diode being adjacent said first capacitor, and a first resistor connected between said plate of said first diode and said combining means, and wherein said second detecting means comprises a second diode connected in series with a second capacitor across the output of said second amplifier means, the cathode of said second diode being adjacent said second capacitor and a second resistor connected between said cathode of said second diode and said combining means.

5. A discriminator comprising, an input terminal adapted to receive beat frequency signals from a transmitter and a local oscillator, first and second tuned circuits tuned respectively an equal amount above and below a predetermined frequency, first and second means for detecting respectively the outputs of said first and second tuned circuits, and means combining the outputs of said first and second detecting means, said first detecting means comprising a first diode, a first capacitor and a first resistor, said first diode being connected in series with said first capacitor across the output of said first tuned circuit, the plate of said first diode being connected to said first capacitor, said first resistor being connected between said plate of said first diode and said combining means, said second detecting means comprising a second diode, a second capacitor, and a second resistor, said second diode being connected in series with said second capacitor across the output of said second tuned circuits, the cathode of said second diode being connected to said second capacitor, said second resistor being connected between said cathode of said second diode and said combining means.

6. Apparatus as in claim 5 wherein said first and second tuned circuits are first and second tuned amplifying means tuned respectively an equal amount above and below a predetermined frequency.

7. Apparatus of claim 5 and means responsive to said combined outputs controlling the local oscillator frequency whereby said beat frequency is maintained at said predetermined frequency, said means being operative in the absence of an output from said discriminator to sweep the frequency of said local oscillator.

8. In an automatic frequency control system comprising a discriminator and means for applying the beat frequency signals from a transmitter and local oscillator to the input of said discriminator, apparatus responsive to the output of said discriminator for controlling the frequency of said local oscillator, comprising, an electron tube having at least a control grid, a screen grid, a suppressor grid, a cathode and an anode, a source of supply potential, an anode load impedance, means returning the more positive terminal of said supply potential to said anode through said anode load impedance, means coupling the output of said discriminator to said control grid, means coupling said suppressor grid to said screen grid, means coupling said control grid to said anode, means maintaining said screen grid and said cathode at predetermined potential levels, and means coupled to said anode for abstracting a signal for controlling the frequency of said local oscillator whereby said beat frequency is maintained at a predetermined frequency, said signal abstracted from said plate being periodic in the absence of an output signal from said discriminator whereby said local oscillator frequency is periodically varied until a discriminator output is produced.

9. An automatic frequency control system comprising, a discriminator having an input adapted to receive beat frequency signals from a transmitter and a local oscillator, a transitron oscillator coupled to the output of said discriminator, and means operatively associated with said transitron oscillator and said discriminator precluding the oscillator action of said transitron oscillator in the presence of a discriminator output signal, said transitron oscillator functioning as an oscillator in the absence of a discriminator output signal, said transitron oscillator functioning as an amplifier in the presence of a discriminator output signal, the output of said oscillator controlling the frequency of said local oscillator.

10. An automatic frequency control system comprising, an input terminal adapted to receive beat frequency signals from a transmitter and a local oscillator, first and second tuned amplifying channels tuned respectively an equal amount above and below a predetermined frequency, first and second means detecting respectively the outputs of said first and second channels, means combining the outputs of said first and second detecting means, said first detecting means comprising a first diode, a first capacitor, and a first resistor, said first diode being connected in series with said first capacitor across the output of said first channel, the plate of said first diode being connected to said first capacitor, said first resistor being connected between said plate of said first diode and said combining means, said second detecting means comprising a second diode, a second capacitor, and a second resistor, said second diode being connected in series with said second capacitor across the output of said second channel, the cathode of said second diode being connected to said second capacitor, said second resistor being connected between said cathode of said second diode and said combining means, a multi-grid electron tube having at least a cathode, a control grid, a suppressor grid, a screen grid, and an anode, a source of supply potential, an anode load impedance, means returning the more positive terminal of said source of supply potential to said anode of said multi-grid tube through said anode load impedance, means coupling said control grid to said combining means whereby the combined outputs of said first and second detectors are coupled to said control grid, means coupling said suppressor grid to said screen grid, means coupling said control grid to said anode of said multi-grid tube, means maintaining said screen grid and said cathode of said multi-grid tube at predetermined potential levels, said multi-grid tube acting as a direct coupled amplifier at control grid to cathode potentials at said multi-grid tube more positive than a predetermined critical negative level, said multi-grid tube acting as a transitron oscillator at control grid to cathode potentials at said multi-grid tube less negative than said critical level, means biasing said first and second diodes to the operating voltage levels of said multi-grid tube, whereby said multi-grid tube functions as a transitron oscillator in the absence of a signal at said control grid and said multi-grid tube functions as a direct coupled amplifier in the presence of a signal at said control grid, and means abstracting a control signal from the anode of said multi-grid tube for controlling the frequency of said local oscillator.

References Cited in the file of this patent

UNITED STATES PATENTS

| Number | Name | Date |
|---|---|---|
| 2,304,377 | Roberts | Dec. 8, 1942 |
| 2,357,984 | Travis | Sept. 12, 1944 |
| 2,404,568 | Dow | July 23, 1946 |
| 2,434,294 | Ginzton | Jan. 13, 1948 |